United States Patent
Kopinsky

(10) Patent No.: US 9,945,333 B2
(45) Date of Patent: Apr. 17, 2018

(54) FUEL VAPOR RECOVERY

(71) Applicant: The ITB Group, Novi, MI (US)

(72) Inventor: Joel Kopinsky, Farmington Hills, MI (US)

(*) Notice: Subject to any disclaimer, the term of this patent is extended or adjusted under 35 U.S.C. 154(b) by 0 days.

(21) Appl. No.: 15/244,011

(22) Filed: Aug. 23, 2016

(65) Prior Publication Data

US 2017/0107954 A1    Apr. 20, 2017

Related U.S. Application Data

(60) Provisional application No. 62/243,936, filed on Oct. 20, 2015, provisional application No. 62/277,056, filed on Jan. 11, 2016.

(51) Int. Cl.
*F02M 33/08* (2006.01)
*F02M 25/08* (2006.01)
*B60K 15/035* (2006.01)

(52) U.S. Cl.
CPC ....... *F02M 33/08* (2013.01); *B60K 15/03504* (2013.01); *F02M 25/0872* (2013.01); *B60K 2015/03514* (2013.01); *F02M 2025/0863* (2013.01)

(58) Field of Classification Search
CPC .... F02M 33/08; F02M 25/08; F02M 25/0872; F02M 25/0863; B60K 15/03; B60K 15/03504
See application file for complete search history.

(56) References Cited

U.S. PATENT DOCUMENTS

| | | | | |
|---|---|---|---|---|
| 3,515,108 A | * | 6/1970 | Daigh | F02M 25/089 123/519 |
| 4,359,996 A | * | 11/1982 | Kirkland, Jr. | F02M 31/18 123/553 |
| 4,671,071 A | | 6/1987 | Sasaki | |
| 6,540,815 B1 | * | 4/2003 | Hiltzik | B01D 53/02 123/519 |
| 6,569,228 B2 | * | 5/2003 | Ito | B01D 53/229 123/519 |
| 9,334,837 B2 | | 5/2016 | Chung | |
| 9,441,582 B2 | * | 9/2016 | Hagen | F02M 25/089 |

FOREIGN PATENT DOCUMENTS

JP    2000008982 A  *  1/2000  ............. F02M 37/00

* cited by examiner

*Primary Examiner* — Hieu T Vo
(74) *Attorney, Agent, or Firm* — William J. Clemens; Shumaker, Loop & Kendrick, LLP

(57) ABSTRACT

Fuel vapor emissions from a fuel tank directed to a canister containing adsorbent are minimized by an intermediate condenser and conduit configuration. Condensing and cooling fuel vapor emissions allows a reduction in canister capacity, where the canister can still meet and accommodate refueling and/or diurnal emissions control requirements. Pressurized and unpressurized fuel tanks for various vehicles, including vehicles with an internal combustion engine and hybrid electric vehicles, can be configured with the present fuel vapor recovery systems.

24 Claims, 1 Drawing Sheet

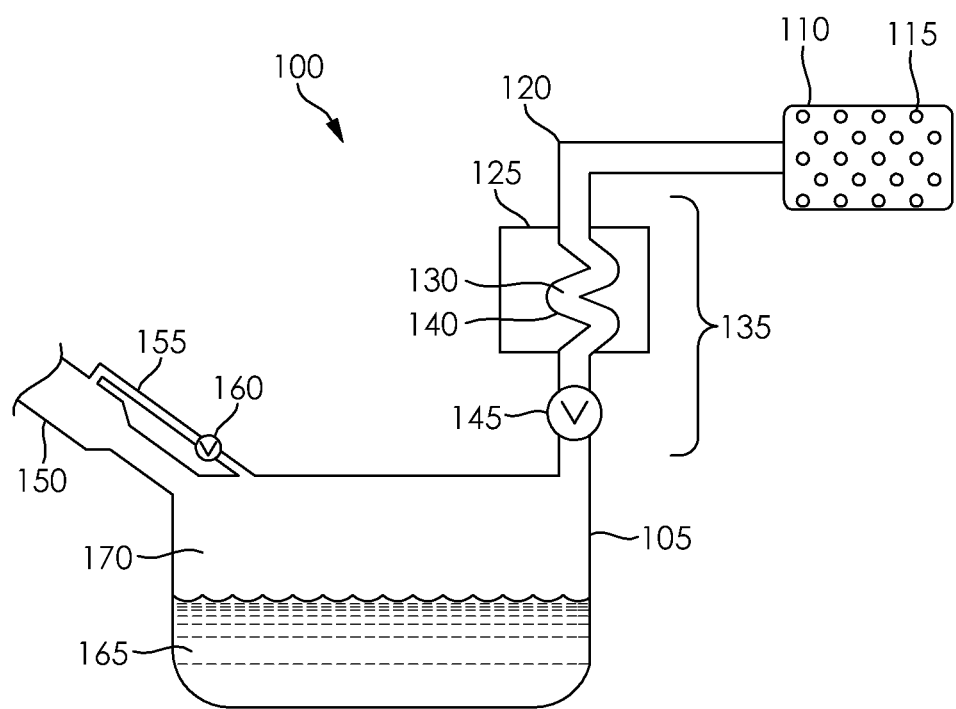

FUEL VAPOR RECOVERY

CROSS-REFERENCE TO RELATED APPLICATIONS

This application claims the benefit of U.S. Provisional Application Nos. 62/243,936 filed on Oct. 20, 2015 and 62/277,056 filed on Jan. 11, 2016. The entire disclosures of the above applications are incorporated herein by reference.

FIELD

The present technology relates to fuel vapor recovery, including recovery of refueling and diurnal emissions.

INTRODUCTION

This section provides background information related to the present disclosure which is not necessarily prior art.

Various strategies can be used to address fuel vapor control and management in various vehicle systems, including vehicles having an internal combustion engine and hybrid electric vehicles. A common approach is the use of a canister containing activated carbon that captures fuel vapor sent out the fuel tank. This vapor would otherwise be emitted into the atmosphere and arises either from increasing temperatures within the fuel tank due to ambient temperature changes or vehicle operation or as a result of refueling the vehicle which results in liquid fuel displacing the air/fuel mixture in the tank. An alternative approach is the use of a fuel tank isolation valve that allows only refueling emissions to vent out the tank. Other emissions, such as diurnal and running losses, are prevented by allowing a pressure to build-up within the tank. Engine-on conditions produce a vacuum which causes atmospheric air to purge the canister of adsorbed fuel vapors. The air/fuel mixture is then sent to the engine for combustion.

During the refueling process for a vehicle, a mixture of fuel vapor and air can be passed out of the fuel tank and can flow to a canister containing adsorbent such as activated carbon. This fuel vapor and air mixture can be passed out of the fuel tank as a result of being displaced by liquid fuel filling the tank, for example. In North America, and in China within a few years, the outgoing emissions can be controlled by an on-board refueling vapor recovery (ORVR) system. The capture of the fuel vapors by the ORVR system can include the use of an activated carbon emission control canister. When the vehicle's internal combustion engine operates, the vapors can be purged from the activated carbon canister and combusted in the engine.

Canisters including a fuel vapor adsorbent can also be used on internal combustion engine powered vehicles in order to capture fuel vapors emitted from the fuel tank from various emission events other than refueling emissions. However, the need to capture refueling emissions can require the use of a much larger canister. In particular, for plug-in hybrid vehicles and other vehicles that have limitations on the amount of purge air available during vehicle operations, a pressurized fuel tank can be used, and in such cases the only time fuel vapor emissions from the tank occur is during a refueling event. Such vehicles can still require a large canister, however, in order to sufficiently capture refueling vapors during a refueling event.

There is a need to maximize the efficiency and effectiveness in recovering fuel vapor emissions for vehicles employing a volatile or pressurized fuel.

SUMMARY

The present technology includes systems, processes, and articles of manufacture that relate to fuel vapor recovery that allow for cooling and/or condensing fuel vapor in order to maximize recovery directly back to the tank and thereby to minimize the capacity of a canister containing a fuel vapor adsorbent.

Various fuel vapor recovery systems are provided that include a fuel tank, a canister including an adsorbent, a conduit fluidly coupling the fuel tank and the canister, and a condenser configured to cool a portion of a fluid in the conduit. The fuel vapor recovery system is configured to direct a flow of the fluid in the conduit from the fuel tank to the canister, including the portion of the fluid in the conduit cooled by the condenser. The conduit can be configured to direct a condensed fluid to the fuel tank by gravity, where the condensed fluid arises in the portion of the fluid in the conduit that is cooled by the condenser. The condenser can be configured to operate by thermoelectric cooling or other cooling means known in the art.

Various methods of fuel vapor recovery are provided that include moving a fluid from a fuel tank to a canister, where the canister includes an adsorbent. The fluid moving from the fuel tank to the canister is cooled. Cooling the fluid moving from the fuel tank to the canister can include condensing a portion of the fluid. The condensed portion of the fluid can be directed to the fuel tank by gravity.

Various methods of fuel vapor recovery are provided that employ a fuel tank including a fluid, a canister including an adsorbent, a conduit fluidly coupling the fuel tank and the canister, and a condenser configured to cool a portion of the fluid in the conduit. The fluid is moved from the fuel tank to the canister, where the fluid moving from the fuel tank to the canister is cooled using the condenser. Cooling the fluid moving from the fuel tank to the canister using the condenser can include condensing a portion of the fluid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The FIGURE is a schematic view, partly in cross-section, of a fuel vapor recovery system according to an embodiment of the present technology.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. Except where otherwise expressly indicated, all numerical quantities in this description are to be understood as modified by the word "about" and all geometric and spatial descriptors are to be understood as modified by the word "substantially" in describing the broadest scope of the technology.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

The present technology provides ways to improve fuel vapor recovery in various systems, such as ORVR systems, by cooling and/or condensing fuel vapors to optimize adsorption of fuel vapor introduced to a canister including an adsorbent and/or to reduce the load of fuel vapor introduced to the canister including the adsorbent. In particular, the use of a condenser to cool and/or condense vapors prior to being sent to a canister during a refueling event can maximize the efficiency and effectiveness in recovering fuel vapor emissions with the canister and can considerably reduce the required size of the canister. A condenser, such as for example a thermoelectric cooler, can be used to cool and/or condense a fraction of the emitted fuel vapors. Such a condenser can be configured to operate in response to an electrical signal, where the condenser temperature can decrease so as to result in a cooling and/or a condensation of at least a fraction of the fuel vapors subjected thereto. For pressurized fuel tanks, the electrical signal to operate the condenser can be provided in conjunction with the activation of a tank depressurization device that operates to reduce the fuel tank pressure prior to the fuel tank being accessed for refueling. For example, condenser activation can be joined or integrated with the tank depressurization device.

Additional benefits and advantages of the present technology include the following aspects. As the condenser cools the fluid flowing toward the canister, an adsorption efficiency of the adsorbent (e.g., activated carbon) in the canister can be increased for fuel vapor that enters the canister (e.g., non-condensed fuel). Use of the condenser can also reduce or eliminate the need to send an amount of fuel vapor out of the fuel tank through a recirculation line configured as part of a refueling inlet during a refueling operation. Such a recirculation line is typically used to reduce the amount of fuel vapor sent to the canister, but the amount of fuel vapor directed through the recirculation line can be considerably reduced or eliminated altogether by cooling and/or condensing the fuel vapor fluid sent to the canister. The use of a condenser, in other words, a component for at least partially removing the fuel vapor from a fuel vapor/air mixture, can also benefit various ORVR systems; i.e., vehicles other than plug-in hybrid electric vehicles, including diurnal emissions from vehicle fuel tanks.

The present fuel vapor recovery systems and methods can be combined and used with aspects of other fuel recovery systems and components, such as the on board refueling vapor recovery system described in U.S. Pat. No. 4,887,578 to Woodcock et al., the method and system for fuel vapor control described in U.S. Pat. No. 8,056,540 to DeBastos et al., the isolation valve with fast depressurization for a high-pressure fuel tank described in U.S. Pat. No. 8,944,100 to Pifer, and fuel tank vapor control system and recirculation line described in U.S. Pat. No. 7,055,556 to Benjey et al. In this way, for example, the present technology can serve to maximize the efficiency and effectiveness in recovering fuel vapor emissions in such systems.

For embodiments relating to ORVR systems, a decision can be made that the vehicle is being refueled and that the condenser should be operated. This allows the system to use a smaller carbon canister, which in turn would reduce the purge load of fuel vapors sent from the canister to the engine. In a similar manner, during a diurnal emission, well known to those experienced in the art of fuel tank vapor control, a sensor could determine a change in temperature and or internal fuel tank pressure that can lead to an emission of fuel vapor. At such time, the condenser could be placed into operation.

In certain embodiments, a fuel vapor recovery system is provided that includes a fuel tank, a canister including an adsorbent, a conduit fluidly coupling the fuel tank and the canister, and a condenser configured to cool a portion of a fluid in the conduit. The fuel vapor recovery system is configured to direct a flow of the fluid in the conduit from the fuel tank to the canister, including the portion of the fluid in the conduit cooled by the condenser. The fuel tank can be a pressurized fuel tank or an unpressurized fuel tank. The canister including the adsorbent can be referred to as an EVAP canister and the adsorbent can include a material suitable to adsorb a fuel vapor, particularly a hydrocarbon vapor. The adsorbent can include activated carbon commonly referred to in the art as charcoal. The amount of adsorbent and size of the canister can be tailored to an amount of fuel vapor that needs to be adsorbed. As noted herein, the cooling of the fuel vapor by the condenser can improve adsorption of the fuel vapor to the adsorbent and condensing of the fuel vapor can limit the amount of fuel vapor that reaches the canister and consequently reduce the amount of fuel vapor that the canister and adsorbent must accommodate. A further significant benefit is the fact that by limiting the amount of vapor sent to the canister, the amount of purge air required to purge the canister is reduced. This in turn benefits the control of exhaust emissions that occur when unknown amounts of vapors are sent to the engine for combustion.

To aid in returning condensed fuel vapor to the fuel tank, the conduit can be configured to direct the condensed fluid to the fuel tank by gravity, where the condensed fluid arises in the portion of the fluid in the conduit that is cooled by the condenser. The condensed fluid can also drop into the fuel tank, drain into the fuel tank, or be wicked back to the fuel tank.

The condenser can include various devices known to effect heat transfer resulting in a heated portion and a cooled portion. The condenser can operate to transfer heat from the fluid in the conduit to another portion of the condenser or to a heat-sink outside of the condenser or even outside of the fuel vapor recovery system. Suitable condensers include those that operate by thermoelectric cooling using the Peltier effect and can be electrically activated or actuated by an electric signal. Such condensers are known in the art as a Peltier device, Peltier heat pump, solid state refrigerator, or thermoelectric cooler. Other condensers include surface condensers, such as a shell and tube heat exchanger, refrigeration cycle heat exchangers, air cooled condensers, liquid cooled condensers, evaporative condensers, fans, piezoelectric pumps including piezo cooling jets, various passive and active heat sinks, heat pipes, and other types of heat exchangers and cooling devices. In certain embodiments, the condenser can be thermally coupled with the heating, ventilation, and air conditioning (HVAC) system of the vehicle or can be configured as part of the HVAC system of the vehicle. An air conditioning unit of the HVAC system, for example, can be configured to as the condenser or work in conjunction with the condenser. More than one type of condenser can be employed, as well. The condenser can include or work in conjunction with a tortuous path in the conduit. As the fuel vapor or fluid moves through the tortuous path, it can be cooled by the condenser, where the tortuous path increases the residence time of the fluid including air and fuel vapor with the condenser so as to increase the cooling and/or condensation efficiency of the fuel vapor.

Movement of the fluid through the conduit between the fuel tank and the canister can be controlled using one or more valves. One or more valves can be positioned between the fuel tank and where the fluid encounters the condenser and/or between where the fluid encounters the condenser and the canister. The one or more valves can include a depressurization valve for depressurizing a pressurized fuel tank. It should also be noted that the conduit fluidly coupling the fuel tank and the canister can include various inlets and outlets each with one or more respective valves. Likewise, the canister can include additional inlets and outlets with one or more respective valves. As known in the art, for example, the canister can be fluidly coupled to various vacuum lines and/or pressure lines that are operable to purge the canister of adsorbed fuel vapor and direct the purged fuel vapor to the engine for combustion.

The fluid including fuel vapor/air moving from the fuel tank through the conduit can also pass through a vapor-liquid separator or a vapor-liquid separation valve, as employed in the art, so as to prevent liquid fuel from reaching the canister. Various vapor-liquid separators include, for example, those described in U.S. Pat. No. 5,103,877 to Sherwood et al. and U.S. Pat. No. 7,631,635 to Hochstein et al. The present condenser can be configured such that it is integrated with a vapor-liquid separation function or is configured to work in conjunction or inline in the conduit with such a vapor-liquid separator. For example, a fluid including fuel vapor/air moving from the fuel tank can encounter the vapor-liquid separator or separation valve prior to encountering the present condenser before ultimately reaching the canister. Another benefit of the fuel vapor recovery systems and methods according to the present technology, however, is that the condenser can allow the system to forgo the need for a conventional vapor-liquid separator. Thus, the conduit fluidly coupling the fuel tank and the canister of the present technology can be expressly configured without a vapor-liquid separator or separation valve.

The fuel vapor recovery system can be adapted for various fuel tank applications. For example, the present systems can recover fuel vapor emissions for vehicles employing a volatile or pressurized fuel, including vehicles using an internal combustion engine and hybrid electric vehicles. The present systems can recover fuel vapor emissions when the fuel tank is being filled with fuel and can recover diurnal emissions resulting from daily temperature fluctuations. Pressurized and unpressurized fuel tanks can be used. However, the present fuel recovery systems are not limited to ORVR systems. Various fuel tanks for storing fuel can benefit from the present fuel vapor recovery technology. These include various fuel tanks for storing various volatile or pressurized fuels, including various volatile organic compounds and hydrocarbons.

The fuel tank can include a refueling inlet fluidly coupled thereto. A fluid fuel can be dispensed into the fuel tank through the refueling inlet, which imparts pressure onto any air and fuel vapor contained within the fuel tank. The air/fuel vapor then moves through the conduit fluidly coupling the fuel tank and the canister in order to make room for the new fuel filling the fuel tank. The condenser serves to minimize the amount of fuel vapor reaching the canister by condensing at least a portion of the fuel vapor, the condensed fuel vapor fluid returning to the fuel tank, where the cooled and reduced fuel vapor fluid maximizes adsorption of any remaining fuel vapor to the adsorbent in the canister.

The refueling inlet can include a recirculation line that fluidly couples a portion of the refueling inlet and the fuel tank. The recirculation line can be configured to return fuel vapor to the portion of the refueling inlet from the fuel tank when fuel is dispensed to the refueling inlet. In this way, the recirculation line reduces an amount of fuel vapor displaced from the fuel tank by new fuel that is directed to the canister. Various recirculation line configurations are known in the art; e.g., U.S. Pat. No. 7,055,556 to Benjey et al. A notable benefit of the present technology, however, it that the fuel vapor recovery system can forgo the inclusion and use of a recirculation line due to the operation of the condenser mitigating the amount of fuel vapor present in fluid moving from the fuel tank to the canister during refilling of the fuel tank. Thus, a fuel vapor recovery system according to the present technology can have a refueling inlet that does not include a recirculation line fluidly coupling the refueling inlet and the fuel tank. This can simplify manufacture, operation, and efficiency of the fuel vapor recovery system, including how the fuel vapor recovery system interacts with a filling operation or filling station.

In certain embodiments, a method of fuel vapor recovery is provided that includes moving a fluid from a fuel tank to a canister, where the canister includes an adsorbent, and cooling the fluid moving from the fuel tank to the canister. The fuel tank can include a pressurized fuel tank and the adsorbent can include activated carbon. Cooling the fluid moving from the fuel tank to the canister can include condensing a portion of the fluid. The method can further include directing the condensed portion of the fluid to the fuel tank by gravity. Moving the fluid from the fuel tank to the canister can include moving the fluid through a conduit fluidly coupling the fuel tank and the canister. Cooling the fluid moving from the fuel tank to the canister can include cooling a portion of the fluid in the conduit using a condenser. The condenser can be configured to operate by thermoelectric cooling and can be actuated by an electrical signal. The portion of the fluid in the conduit that is cooled by the condenser can follow a tortuous path. The method can further include regulating movement of the fluid from the fuel tank to the canister using a valve.

Methods of fuel vapor recovery can also include providing a fuel tank including a fluid, a canister including an adsorbent, a conduit fluidly coupling the fuel tank and the canister, and a condenser configured to cool a portion of the fluid in the conduit. The fluid is moved from the fuel tank to the canister and the fluid moving from the fuel tank to the canister is cooled using the condenser. Cooling the fluid moving from the fuel tank to the canister using the condenser can include condensing a portion of the fluid and the condensed portion of the fluid can be directed to the fuel tank by gravity.

EXAMPLE

With reference to the FIGURE, an embodiment of a fuel vapor recovery system 100 according to the present technology is shown in partial cross-section. The fuel vapor recovery system 100 includes a fuel tank 105, a canister 110 including an adsorbent 115, a conduit 120 fluidly coupling the fuel tank 105 and the canister 110, and a condenser 125 configured to cool a portion of a fluid 130 in the conduit 120. The fuel vapor recovery system 100 is configured to direct a flow of the fluid in the conduit 120 from the fuel tank 105 to the canister 110, including the portion of the fluid 130 in the conduit 120 cooled by the condenser 125. The conduit 120 includes a vertical portion 135 that is configured to direct a condensed fluid therein to the fuel tank 105 by gravity, where the condensed fluid can arise in the portion of the fluid 130 in the conduit 120 that is cooled by the condenser 125. The condenser 125 shown is configured to operate by thermoelectric cooling and can be actuated by an electrical signal. The portion of the fluid 130 in the conduit 120 that is cooled by the condenser 125 follows a tortuous path 140 serving to increase the residence time of the fluid cooled by the condenser 125. A valve 145 is configured to control movement of the fluid through the conduit 120. As shown, the valve 145 is located between the fuel tank 105 and the condenser 125, but the valve 145 or additional valves can be located at other parts of the conduit 120, including between the condenser 125 and the canister 110.

A refueling inlet 150 is fluidly coupled to the fuel tank 105. A recirculation line 155 fluidly couples a portion of the refueling inlet 150 and the fuel tank 105. The recirculation line 155 is configured to return fuel vapor to the portion of the refueling inlet 150 from the fuel tank 105 when fuel is dispensed through the refueling inlet 150 into the fuel tank 105. Another valve 160 can be used to control movement of fuel vapor through the recirculation line 155. However, the present technology allows the fuel vapor recovery system 100 to be configured without the recirculation line 155, as shown. In this case, fuel vapor that would have been returned to the portion of the refueling inlet 150 from the fuel tank 105 through the recirculation line 155 when fuel is dispensed to the fuel tank 105 through the refueling inlet 150 would instead be directed through the conduit 120 toward the canister 110.

Operation of the fuel vapor recovery system 100 can include the following aspects during refueling of the fuel tank 105. Fuel is dispensed through the refueling inlet 150 into the fuel tank 105. As shown, the fuel tank 105 includes a volume of liquid fuel 165 and a volume of air and fuel vapor 170. The volume of air and fuel vapor 170 is displaced from the fuel tank 105 during refueling by the addition of liquid fuel 165, where a portion of the volume of air and fuel vapor 170 can travel through the recirculation line 155 to the portion of the refueling inlet 150, where the fuel vapor recovery system 100 is so equipped. Where the fuel vapor recovery system 100 does not include a recirculation line 155, or where the return capacity of fuel vapor through the recirculation line 155 is limited or exceeded, all or a portion of the displaced volume of air and fuel vapor 170 is moved through the conduit 120 toward the adsorbent 115 in the canister 110. The condenser 125 is activated to cool the displaced volume of air and fuel vapor 170. Cooling the fluid (i.e., displaced air and fuel vapor 170) moving through the conduit 120 using the condenser 125 thereby condenses a portion of the fuel vapor in the fluid as it moves through the tortuous path 140. Condensed liquid fuel within the vertical portion 135 of the conduit 120 is directed to the fuel tank 105 by gravity. Any remaining fuel vapor in the cooled fluid that enters the canister 110 is adsorbed by the adsorbent 115. In this manner, the fuel vapor recovery system 100 can minimize the amount of fuel vapor that reaches the canister 110 thereby allowing use of a smaller capacity canister 110 than a system without a condenser 125 and the present configuration. The canister 110 can also be fluidly coupled to various vacuum lines and/or pressure lines (not shown) that are operable to purge the canister of adsorbed fuel vapor and direct the purged fuel vapor to the engine for combustion, as is known in the art.

Operation of the of the fuel vapor recovery system 100 can include the following aspects in collecting dirunal fuel vapor emissions. One or more separate pressure and/or temperature sensors (not shown) or a pressure and/or temperature sensing function of the valve 145 can sense a predetermined pressure and/or temperature of air and fuel vapor 170 in the fuel tank 105. The valve 145 is then opened allowing the air and fuel vapor 170 to move into the conduit 120, where the condenser 125 cools the fluid (i.e., displaced air and fuel vapor 170). For example, the condenser 125 can be activated before, simultaneously with, or after the valve 145 is opened. The condenser 125 can therefore cool and condense diurnal fuel vapor arising from temperature changes, for example, where condensed fuel vapor within the vertical portion 135 of the conduit 120 is directed to the fuel tank 105 by gravity and adsorption of any remaining fuel vapor by the adsorbent 115 in the canister 110 is maximized. Again, the fuel vapor recovery system 100 can minimize the amount of fuel vapor that reaches the canister 110 thereby allowing use of a smaller capacity canister 110 than a system without a condenser 125 and the present configuration.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A fuel vapor recovery system comprising:
   a fuel tank;
   a canister including an adsorbent;
   a conduit fluidly coupling the fuel tank and the canister; and a condenser configured to cool a portion of a fluid in the conduit between the fuel tank and the canister;

wherein the fuel vapor recovery system is configured to direct a flow of the fluid in the conduit from the fuel tank to the canister, including the portion of the fluid in the conduit cooled by the condenser, and direct condensed fluid in the conduit to the fuel tank.

2. The fuel vapor recovery system of claim 1, wherein the fuel tank is a pressurized fuel tank.

3. The fuel vapor recovery system of claim 1, wherein the adsorbent includes activated carbon.

4. The fuel vapor recovery system of claim 1, wherein the conduit is configured to direct a condensed fluid to the fuel tank by gravity, the condensed fluid arising in the portion of the fluid in the conduit that is cooled by the condenser.

5. The fuel vapor recovery system of claim 1, wherein the condenser is configured to operate by thermoelectric cooling.

6. The fuel vapor recovery system of claim 1, wherein the condenser is actuated by an electrical signal.

7. The fuel vapor recovery system of claim 1, wherein the portion of the fluid in the conduit that is cooled by the condenser follows a tortuous path.

8. The fuel vapor recovery system of claim 1, further comprising a valve configured to control movement of the fluid through the conduit.

9. The fuel vapor recovery system of claim 1, further comprising a refueling inlet fluidly coupled to the fuel tank.

10. The fuel vapor recovery system of claim 9, wherein the refueling inlet does not include a recirculation line.

11. A vehicle comprising the fuel vapor recovery system of claim 1.

12. A method of fuel vapor recovery comprising:
moving a fluid from a fuel tank to a canister, the canister including an adsorbent; and
cooling the fluid moving from the fuel tank to the canister.

13. The method of claim 12, wherein the fuel tank is a pressurized fuel tank.

14. The method of claim 12, wherein the adsorbent includes activated carbon.

15. The method of claim 12, wherein cooling the fluid moving from the fuel tank to the canister includes condensing a portion of the fluid.

16. The method of claim 15, further comprising directing the condensed portion of the fluid to the fuel tank by gravity.

17. The method of claim 12, wherein moving the fluid from the fuel tank to the canister includes moving the fluid through a conduit fluidly coupling the fuel tank and the canister.

18. The method of claim 17, wherein cooling the fluid moving from the fuel tank to the canister includes cooling a portion of the fluid in the conduit using a condenser.

19. The method of claim 18, wherein the condenser is configured to operate by thermoelectric cooling.

20. The method of claim 18, wherein the condenser is actuated by an electrical signal.

21. The method of claim 18, wherein the portion of the fluid in the conduit that is cooled by the condenser follows a tortuous path.

22. The method of claim 12, further comprising regulating movement of the fluid from the fuel tank to the canister using a valve.

23. A method of fuel vapor recovery comprising:
providing a fuel tank including a fluid, a canister including an adsorbent, a conduit fluidly coupling the fuel tank and the canister, and a condenser configured to cool a portion of the fluid in the conduit;
moving the fluid from the fuel tank to the canister; and
cooling the fluid moving from the fuel tank to the canister using the condenser.

24. The method of claim 23, wherein cooling the fluid moving from the fuel tank to the canister using the condenser includes condensing a portion of the fluid.

* * * * *